Figure 1:
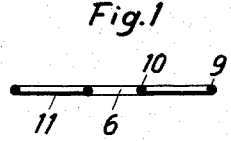

Jan. 4, 1966  R. GOTTSCHALD  3,227,478
BALL AND SOCKET JOINTS
Filed Sept. 8, 1961

United States Patent Office 3,227,478
Patented Jan. 4, 1966

3,227,478
BALL AND SOCKET JOINTS
Rudolf Gottschald, Osterath, Germany, assignor to
A. Ehrenreich & Cie.
Filed Sept. 8, 1961, Ser. No. 136,802
Claims priority, application Germany, Sept. 9, 1960,
E 19,898
3 Claims. (Cl. 287—87)

This invention relates to ball and socket joints in which the clearance between the pin which carries the ball and the opening in the socket through which the pin projects is sealed.

The object of the present invention is to make the seal as complete as possible without making the joint too stiff and also to ensure that the seal is adequately protected from mechanical damage.

It has hitherto been conventional practice to use a cap or bellows to form a seal between the ball pin and the socket. Caps for this purpose have been cup-shaped and fit tightly around the ball pin while the inner surface of the cup bears and slides on a spherical outer surface on the socket. This seal is simple but is not always adequate; although it makes it difficult for dirt to enter the socket it does not completely prevent it doing so.

When a bellows is used one end is fixed to the socket, usually in a groove therein, and the bellows surrounds, and has its other end fixed to, the ball pin. In some cases the pin can rotate within the other end of the bellows. The wall thickness of the bellows is only small in comparison with the wall thickness of a cap since the bellows has to undergo very considerable deformation on movements of the ball pin. Furthermore, the bellows projects to a considerable extent from the socket. The consequence of the small wall thickness and the projection from the socket is extreme susceptibility to damage through external mechanical influences, for example as a result of stones or the like when used externally on motor vehicles. Moreover, a part of the bellows frequently jams between the housing and a lever boss accommodating the joint pin, or the bellows may rub against the boss. This also results in damage to the bellows.

According to this invention, the clearance between the pin which carries the ball and the edge of the opening in the socket through which the pin projects is sealed by a flexible diaphragm-like disc which fits around the pin and the edge of which is fixed to the socket. The flat form of the thin disc enables it to be fixed on the socket as close as possible to the edge of the opening and a flat closure to be formed for the socket by the disc. The pin is pushed through a small opening in the centre of the disc, so that the disc is deformed and a lip which fits snugly and firmly against the pin is formed. This effect may be assisted by providing the edge of the opening with a protruding collar. On rotational or rocking movements of the pin, therefore, sliding of the disc does not occur at the pin or at the socket.

The disc may also have a peripheral bead extending around its outer edge which is fixed to the socket and one or more similar beads may also be provided around the edge of the opening in which the pin fits.

Fixing of the disc to the socket may be effected by a clamping ring which covers the outer edge of the disc, and presses it tightly against the socket.

In this case, a peripheral bead may be provided on the outer edge of the disc on its side facing the socket and then the socket has a groove which accommodates the bead to increase the tightness of the seal and the security of the fastening of the disc to the socket.

The clamping ring encircling the outer periphery of the disc may be pressed on to an outer shoulder part of the socket. The ring has an inwardly projecting part which presses the edge of the disc against the socket. The periphery of the shouldered portion may be cylindrical or conical. The clamping ring forms an additional protective covering for the diaphragm against external influences, for example against stones and the like.

On the outside, the clamping ring may have a spherical surface against which a cup fixed on the pin bears slidably. This acts not only as an additional seal but also as a protective cap for the disc.

It is advantageous for the outer spherical surface of the clamping ring to be a continuation of a spherical outer surface on the socket so that there is no edge having a scraping action on the inner surface of the cap.

Another way of fastening the disc to the socket is for the socket to have a recess extending around the opening through which the pin projects and for the ring which fixes the disc to the socket to be pressed into this recess.

It is important that the disc should be so constructed that it does not bulge or widen out into a bag in any position of the pin to such an extent that the disc may be pinched between the socket and the pin.

The flexibility of the disc may be obtained by forming it from resilient material or by making it of a shape which results in elasticity, or by both.

The disc may be formed of a number of layers of material. A number of ultra-thin layers give greater flexibility and hence impart greater mobility to the pin than a single layer of similar total thickness.

Figure 2:
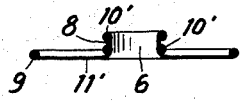
Figure 3:
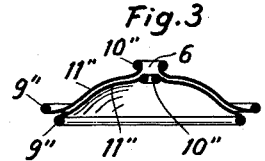

Some examples of ball joints constructed in accordance with the invention are illustrated in the accompanying drawings in which:

FIGURES 1 to 3 are diametric sections through three different sealing discs which form part of the ball joints; and FIGURES 4 to 8 are partly sectional side elevations of five different ball and socket joints.

In all the examples illustrated, the joint comprises a socket 1 and a joint pin 2 which carries a ball 3 which is universally movable in the socket. The ball is held in a resilient plastic lining 4.

An opening 5 through which the pin 2 projects from the housing has, of course, a clearance around the pin 2 to allow the universal movement to take place. The clearance of the opening 5 around the pin 2 is closed by a sealing disc 11.

The sealing disc, which is only thin and in the form of a diaphragm, is made of flexible material. In its centre it has a small aperture 6 for the pin 2. When the latter is fitted through the aperture 6 the latter is opened and its edge undergoes a deformation into the form of a lip 7. The edge of the aperture 6 may be provided with a collar-like extension 8 as shown in FIGURE 2, and when the pin is fitted through the extension with resultant opening to form the spout 7" the extension 8 lengthens (see FIGURES 7 and 8). The spout 7 or 7" fits snugly and tightly against the pin after the latter has been passed through it.

A peripheral bead 9 is provided around the outer edge of the disc. An indical bead 10 is disposed around the edge of the aperture 6 in the disc shown in FIGURE 1. As shown in FIGURE 2 two beads 10' are provided around the extension 8.

As shown in FIGURE 3, the sealing disc has two layers 11", each of which has an outer bead 9" and a bead 10" around the aperture 6. As a modification, two beads enclosing the pin may be provided around the aperture in each layer.

Figure 4:
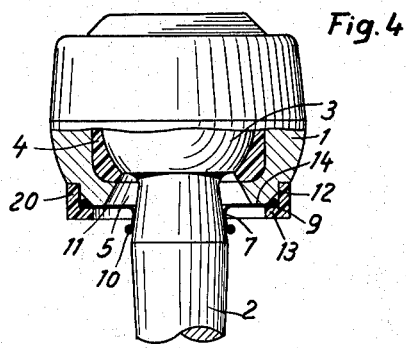
Figure 5:
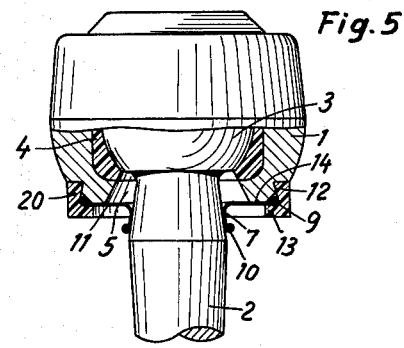

As shown in FIGURES 4 and 5 the sealing disc 11 is fixed by a fastening ring 20 extending around the opening 5 in the socket 1. This ring is pressed on to a shouldered portion 12 of the socket and has an internal shoulder 13 which covers the edge of the disc and presses it against a flattened part 14 of the socket. The bead 9 lies in the gap left between the ring 20 and the outer surface of the socket. In the example shown in FIGURE 4 the shouldered portion 12 is cylindrical while in the example shown in FIGURE 5, the shouldered portion 12 tapers conically towards the socket.

Figure 6:
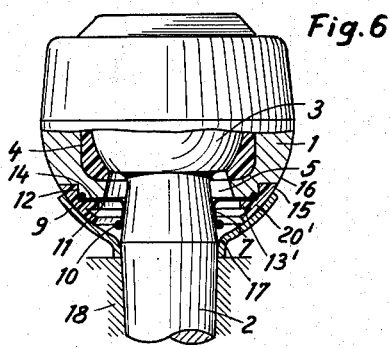

In the example shown in FIGURE 6, a fastening ring 20' is again pressed on to a cylindrical shouldered portion 12 to fasten the sealing disc to the socket. The fastening ring has an inner shoulder 13' by which it covers the outer edge of the sealing disc and presses against the flattened part 14 of the joint housing. The bead 9 of the disc lies in a groove in the socket. The outer surface 15 of the fastening ring is spherical and forms an extension of a spherical outer surface 16 on the socket. A sealing cap 17 is also fixed on the pin 2 and its inner surface bears with a spring force against the surface 15. The numeral 18 denotes a lever boss fitted over the pin 2.

Figure 7:
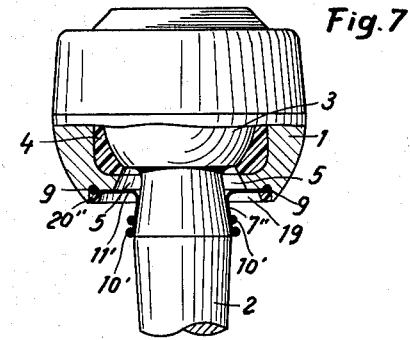
Figure 8:
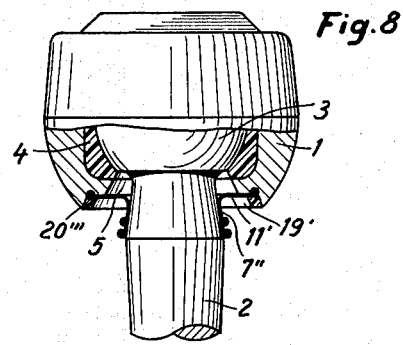

As shown in FIGURES 7 and 8, the socket 1 has an annular recess 19 or 19' on the side where the pin 2 projects and the sealing disc 11' lies in this recess. The edge bead 9 of the sealing disc is accommodated in the base of the recess by a groove-like depression. A fastening ring 20" or 20''' is pressed into the recess and fixes the sealing disc in position. In FIGURE 7 the fastening ring 20" and the recess 19 are cylindrical while in FIGURE 8 the fastening ring 20''' and the recess 19' taper conically towards the joint housing.

In FIGURES 1 to 3 the sealing discs are shown in the reverse position to that in which they are shown assembled with the ball joints in FIGURES 4 to 8.

For a multi-layered diaphragm sealing disc, for example, the sealing disc shown in FIGURE 3 is used, in which case the fastening ring 20 may also have a groove-like depression to accommodate the edge bead 9".

I claim:

1. In a ball and socket joint comprising a socket having a reduced end portion defining an opening, a ball rotatably and rockably mounted in said socket, a pin connected to said ball and projecting through said opening, said opening providing a clearance space around said pin, a flat sealing disc of thin flexible material extending radially inwardly straight across said clearance space and toward said stud, so as to extend substantially normal to the axis of the pin and socket, said disc having a central aperture receiving said pin with a forced fit to provide a secure and tight seal around said pin, an annular counterbore in the reduced end portion of said socket opening, said sealing disc having an outer peripheral edge portion received in said counterbore, and a retaining ring secured in said counterbore over said end portion of said sealing disc for securing said disc in said annular counterbore, said sealing disc extending in a plane disposed axially inwardly of the open end portion of said counterbore.

2. In a ball and socket joint comprising a socket having a reduced end portion defining an opening, a ball rotatably and rockably mounted in said socket, a pin connected to said ball, and projecting through said opening, said opening providing a clearance space around said pin, a flat sealing disc of thin flexible material extending radially inwardly straight across said clearance space and toward said stud so as to extend substantially normal to the axis of the pin and socket, said disc having a central aperture receiving said pin with a forced fit to provide a secure and tight seal around said pin, an annular recess provided along the outer edge of the end portion of said socket, said sealing disc having an outer peripheral edge received in said recess, and a retaining ring secured in said recess over said edge portion of said sealing disc for securing said disc in said recess, said retaining ring having a spherical outer surface contiguous with the outer surface of said socket so as to provide a smooth continuous bearing surface therewith.

3. A ball and socket joint according to claim 2 including a sealing cup having a central aperture fixed to said pin and extending slidably over said spherical outer surface of said retaining ring.

References Cited by the Examiner

UNITED STATES PATENTS

| | | |
|---|---|---|
| 2,559,857 | 7/1951 | Edwards. |
| 2,565,571 | 8/1951 | Naumann _____ 277—187 |
| 2,580,383 | 1/1952 | Frank. |
| 2,600,434 | 6/1952 | Saywell _____ 277—94 X |
| 2,707,645 | 5/1955 | Moskovitz. |
| 3,027,182 | 3/1962 | Reuter _____ 287—87 |

FOREIGN PATENTS

| | | |
|---|---|---|
| 1,116,190 | 1/1956 | France. |
| 494,650 | 10/1938 | Great Britain. |
| 777,002 | 6/1957 | Great Britain. |
| 856,530 | 12/1960 | Great Britain. |

CARL W. TOMLIN, *Primary Examiner.*

WALTER A. SCHEEL, *Examiner.*

A. V. KUNDRAT, *Assistant Examiner.*